United States Patent
Asano et al.

(10) Patent No.: US 9,887,427 B2
(45) Date of Patent: Feb. 6, 2018

(54) FUEL CELL STACK

(71) Applicant: HONDA MOTOR CO., LTD., Tokyo (JP)

(72) Inventors: Yuji Asano, Wako (JP); Toru Iwanari, Wako (JP); Kazuyoshi Miyajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 14/715,599

(22) Filed: May 19, 2015

(65) Prior Publication Data

US 2015/0333346 A1   Nov. 19, 2015

(30) Foreign Application Priority Data

May 19, 2014 (JP) .................... 2014-103537

(51) Int. Cl.

| | |
|---|---|
| *H01M 8/04* | (2016.01) |
| *H01M 8/24* | (2016.01) |
| *H01M 8/04007* | (2016.01) |
| *H01M 8/2485* | (2016.01) |
| *H01M 8/2465* | (2016.01) |

(Continued)

(52) U.S. Cl.
CPC ..... *H01M 8/04074* (2013.01); *H01M 8/2465* (2013.01); *H01M 8/2485* (2013.01); *H01M 8/04007* (2013.01); *H01M 8/04014* (2013.01); *H01M 8/04029* (2013.01); *H01M 8/04052* (2013.01); *H01M 8/04067* (2013.01); *H01M 8/04701* (2013.01); *H01M 8/04731* (2013.01);

(Continued)

(58) Field of Classification Search
CPC .......... H01M 8/04074; H01M 8/2465; H01M 8/2485; H01M 8/04007; H01M 8/04014; H01M 8/04029; H01M 8/04052; H01M 8/04067; H01M 8/04701; H01M 8/04731; H01M 2008/1095; H01M 2250/20
See application file for complete search history.

(56) References Cited

U.S. PATENT DOCUMENTS

| | | | |
|---|---|---|---|
| 8,679,693 B2 | 3/2014 | Oriol | |
| 2012/0058411 A1* | 3/2012 | Kobayashi | ............ H01M 8/241 429/465 |

(Continued)

FOREIGN PATENT DOCUMENTS

JP     2012-526366     10/2012

*Primary Examiner* — Ula C Ruddock
*Assistant Examiner* — Matthew W Van Oudenaren
(74) *Attorney, Agent, or Firm* — Mori & Ward, LLP

(57) ABSTRACT

A fuel cell stack includes a stacked body, a fluid manifold, a first terminal plate, a first insulator, a first end plate, a terminal electrode, and a heat pipe assembly. The first terminal plate is provided on a first end of the stacked body in a stacking direction. The first insulator is provided on the first terminal plate in the stacking direction. The first end plate is provided on the first insulator in the stacking direction. The terminal electrode is connected to the first terminal plate and protrudes from the first end plate in the stacking direction. The heat pipe assembly includes a heat receiving portion and a heat dissipation portion. The heat receiving portion is disposed in the fluid manifold to receive heat from a fluid. The heat dissipation portion is connected to the terminal electrode to release heat received at the heat receiving portion to the terminal electrode.

12 Claims, 10 Drawing Sheets

(51) Int. Cl.
 H01M 8/04029 (2016.01)
 H01M 8/04014 (2016.01)
 H01M 8/04701 (2016.01)
 H01M 8/1018 (2016.01)

(52) U.S. Cl.
 CPC ............... *H01M 2008/1095* (2013.01); *H01M 2250/20* (2013.01); *Y02T 90/32* (2013.01)

(56) References Cited

U.S. PATENT DOCUMENTS

2012/0100450 A1* 4/2012 Lee ..................... H01M 8/0267
 429/436
2013/0017470 A1 1/2013 Hotta et al.

* cited by examiner

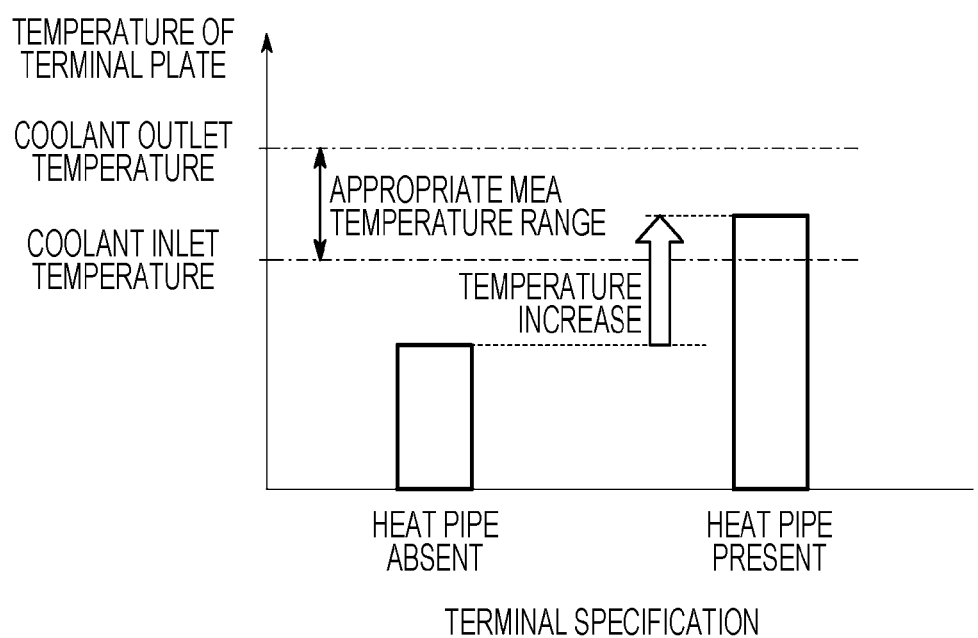

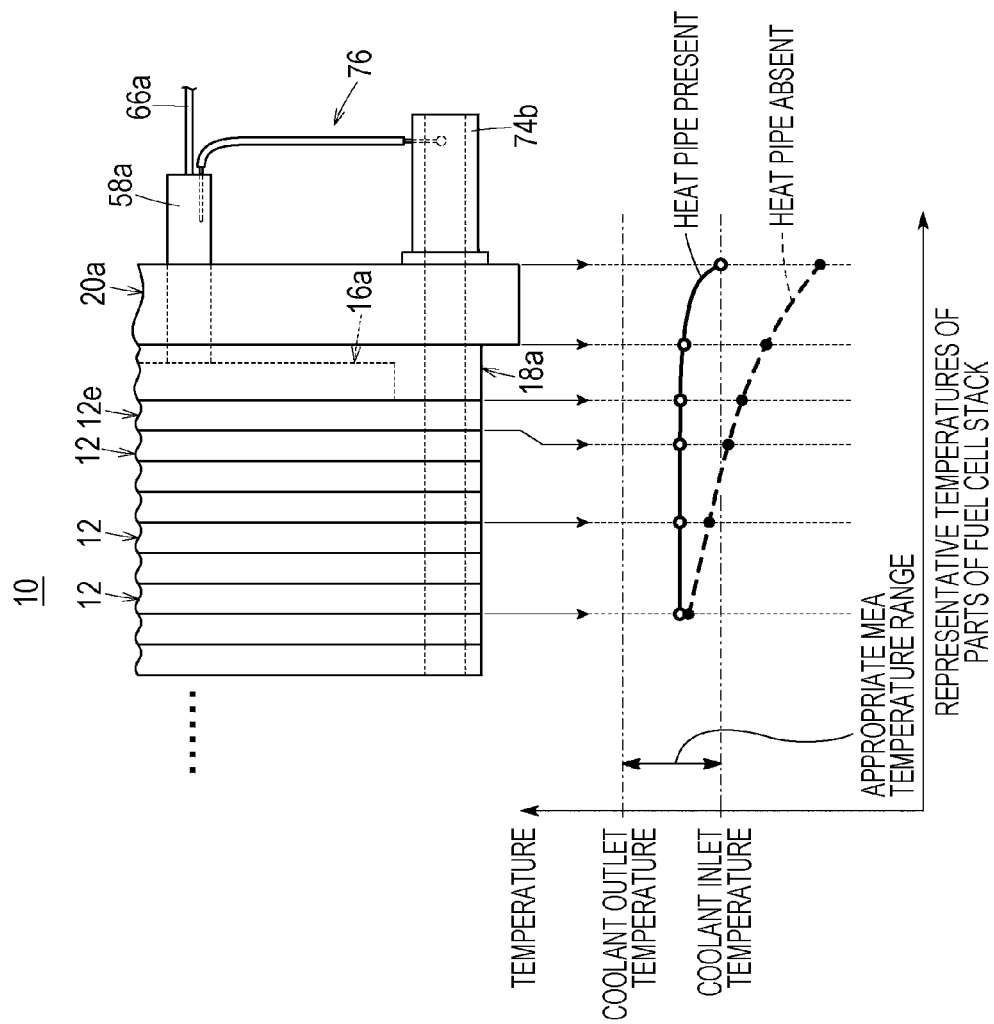

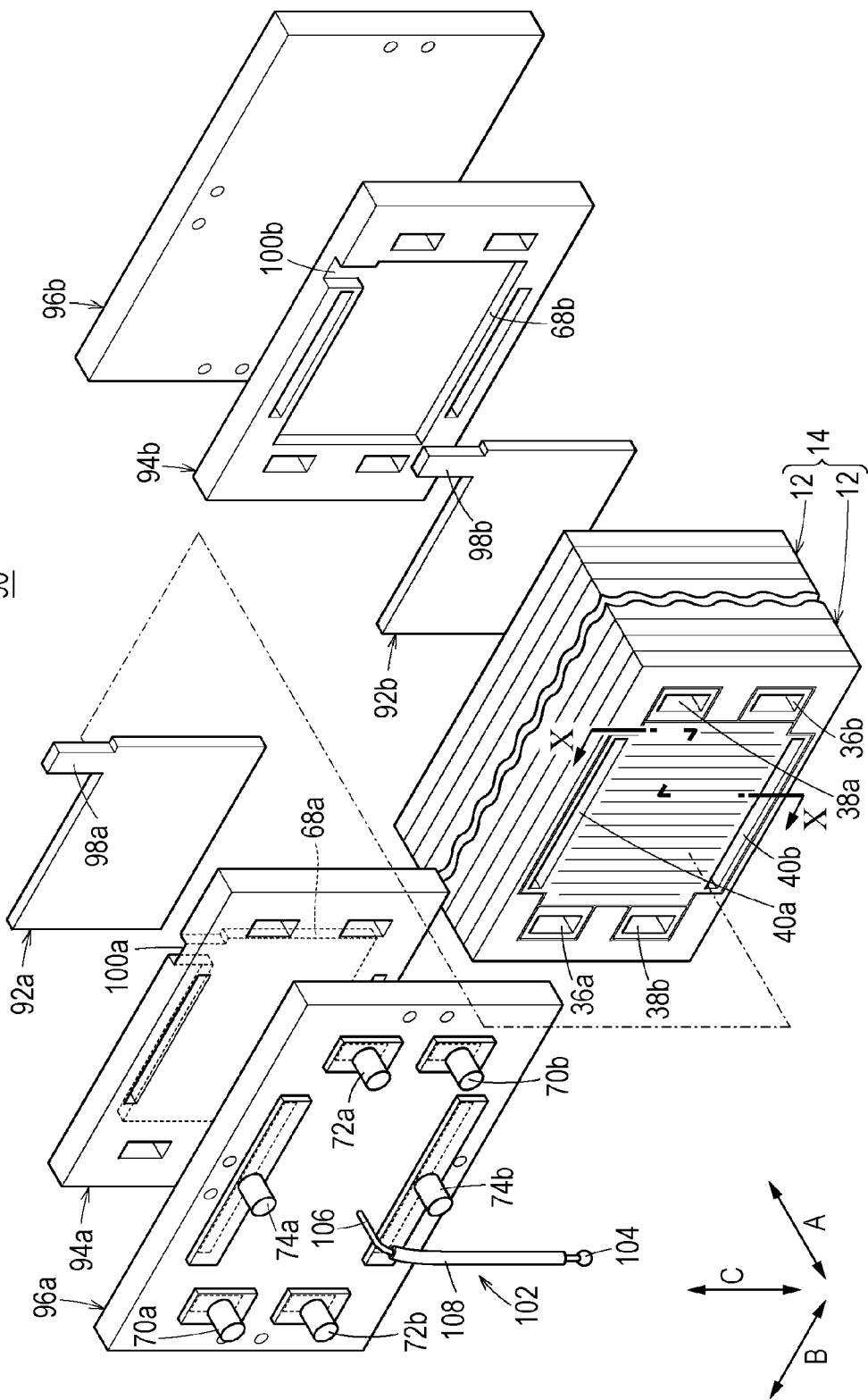

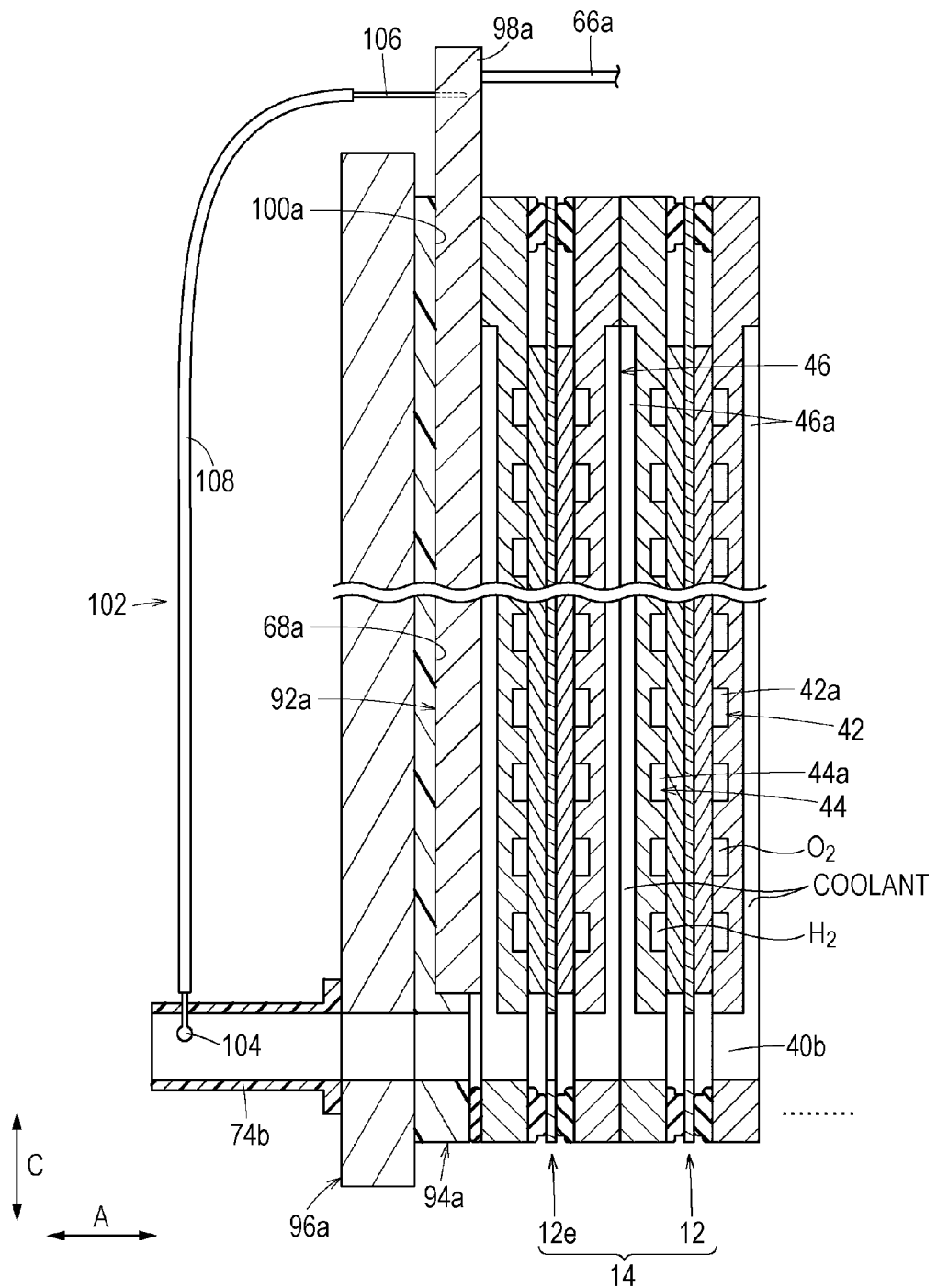

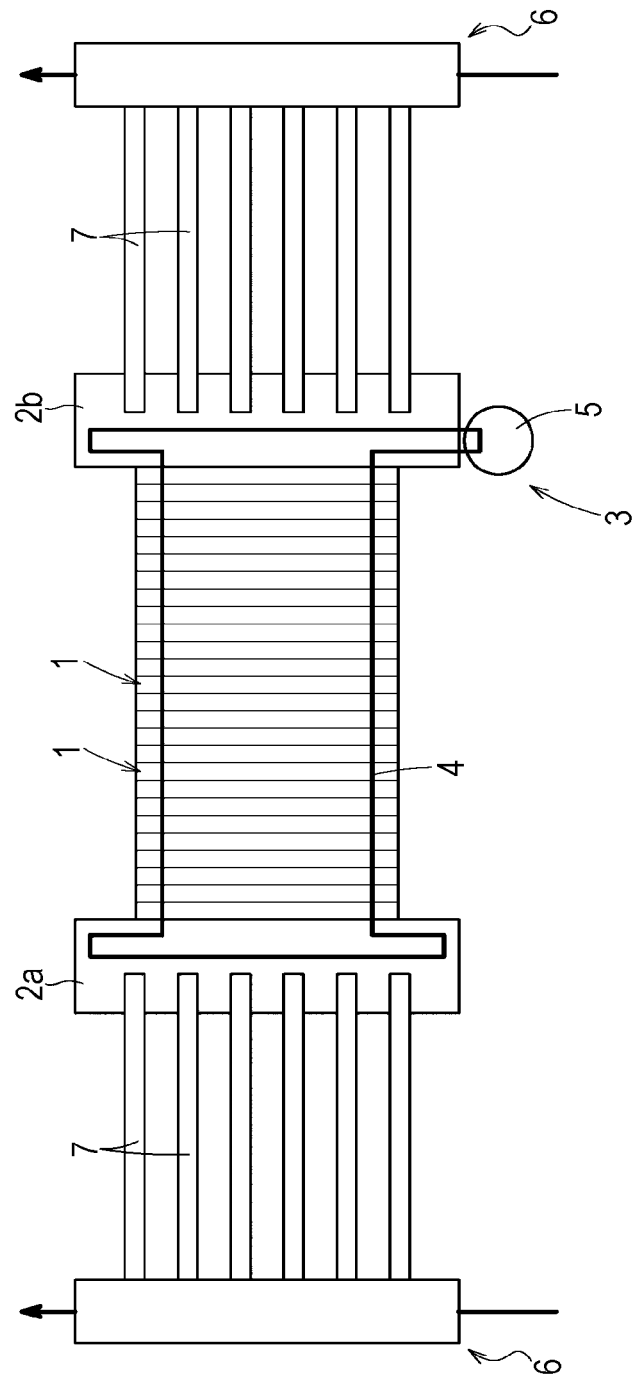

FUEL CELL STACK

CROSS-REFERENCE TO RELATED APPLICATIONS

The present application claims priority under 35 U.S.C. § 119 to Japanese Patent Application No. 2014-103537, filed May 19, 2014, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a solid polymer electrolyte membrane, which is a polymer ion-exchange membrane. The fuel cell includes a membrane electrode assembly (MEA), in which the solid polymer electrolyte membrane is disposed between an anode electrode and a cathode electrode. The anode electrode and the cathode electrode each include an electrode catalyst (electrode catalyst layer) and porous carbon (gas diffusion layer). The MEA and separators (bipolar plates), sandwiching the MEA therebetween, constitute a power generation cell. A fuel cell stack is formed by stacking a predetermined number of such power generation cells and is used, for example, as an automobile fuel cell stack.

In a fuel cell stack, there are some power generation cells whose temperatures tend to become lower than those of others due to dissipation of heat to the outside. For example, heat of a power generation cell that is disposed at an end of the fuel cell stack in the stacking direction (hereinafter, referred to as an "end power generation cell") is dissipated by a large amount from, for example, a power output terminal plate (current collector plate), an end plate, and the like. As a result, the temperature of the end power generation decreases considerably.

As the temperature of the end power generation cell decreases, condensation more likely occurs on the end power generation cell than on power generation cells disposed at a central part of the fuel cell stack. Therefore, a problem arises in that generated water is not smoothly discharged and the power generation performance is reduced.

For example, Japanese Unexamined Patent Application Publication (Translation of PCT Application) No. 2012-526366 discloses a fuel cell that addresses this problem. As illustrated in FIG. 11, the fuel cell includes a stacked body, in which cells 1 are stacked, and end plates 2a and 2b disposed at respective ends of the stacked body. A cooling system 3 is disposed in the fuel cell. The cooling system 3 includes a circulation duct 4 extending through the cells 1 in the stacking direction. A fluid pump 5 circulates a coolant through the circulation duct 4.

Heat extraction units 6 are disposed outside of the end plates 2a and 2b. Each of the heat extraction units 6 includes a plurality of heat pipes 7, and the heat pipes 7 are inserted into the end plates 2a and 2b. The heat pipes 7 receive heat from the coolant flowing through the end plates 2a and 2b along the circulation duct 4, and therefore the cells 1 can be cooled rapidly.

SUMMARY

According to one aspect of the present invention, a fuel cell stack includes a stacked body, a fluid manifold, a terminal plate, an insulator, an end plate, and a heat pipe assembly. A plurality of power generation cells are stacked in the stacked body. Each of the power generation cells includes an electrolyte electrode assembly and a separator. The electrolyte electrode assembly includes an electrolyte and a pair of electrodes sandwiching the electrolyte therebetween. The fluid manifold extends in a stacking direction of the stacked body. The fluid manifold allows a fluid to flow therethrough. The fluid is one of a fuel gas, an oxidant gas, and a coolant. The terminal plate, the insulator, and the end plate are disposed at each of two ends of the stacked body in the stacking direction. The heat pipe assembly is disposed in an outer portion of the fuel cell stack near at least one of the end plates. The heat pipe assembly includes a heat receiving portion disposed in the fluid manifold and receiving heat from the fluid, and the heat dissipation portion connected to a terminal electrode that is disposed on the terminal plate and that is exposed to the outside of the fuel cell stack. The heat dissipation portion dissipates heat, received by the heat receiving portion, to the terminal electrode.

According to another aspect of the present invention, a fuel cell stack includes a stacked body, a fluid manifold, a first terminal plate, a first insulator, a first end plate, a terminal electrode, and a heat pipe assembly. The stacked body includes power generation cells stacked in a stacking direction and has a first end in the stacking direction. Each of the power generation cells includes an electrolyte electrode assembly and a separator. The electrolyte electrode assembly includes a first electrode, a second electrode, and an electrolyte sandwiched between the first electrode and the second electrode. The separator is provided on the electrolyte electrode assembly in the stacking direction. The fluid manifold extends through the stacked body in the stacking direction and a fluid is to flow through the fluid manifold. The first terminal plate is provided on the first end of the stacked body in the stacking direction. The first insulator is provided on the first terminal plate in the stacking direction. The first end plate is provided on the first insulator in the stacking direction. The terminal electrode is connected to the first terminal plate and protrudes from the first end plate in the stacking direction. The heat pipe assembly includes a heat receiving portion and a heat dissipation portion. The heat receiving portion is disposed in the fluid manifold to receive heat from the fluid. The heat dissipation portion is connected to the terminal electrode to release heat received at the heat receiving portion to the terminal electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 shows the difference between the temperature of a terminal plate in the case where the heat pipe assembly is present and the temperature of the terminal plate in the case where the heat pipe assembly is absent.

FIG. 8 shows the temperature distribution of each part of the fuel cell stack.

FIG. 9 is a partially exploded schematic perspective view of a fuel cell stack according to a second embodiment of the present disclosure.

FIG. 10 is a sectional view of the fuel cell stack taken along line X-X of FIG. 9.

FIG. 11 illustrates a fuel cell disclosed in Japanese Unexamined Patent Application Publication (Translation of PCT Application) No. 2012-526366.

DESCRIPTION OF THE EMBODIMENTS

Figure 1:
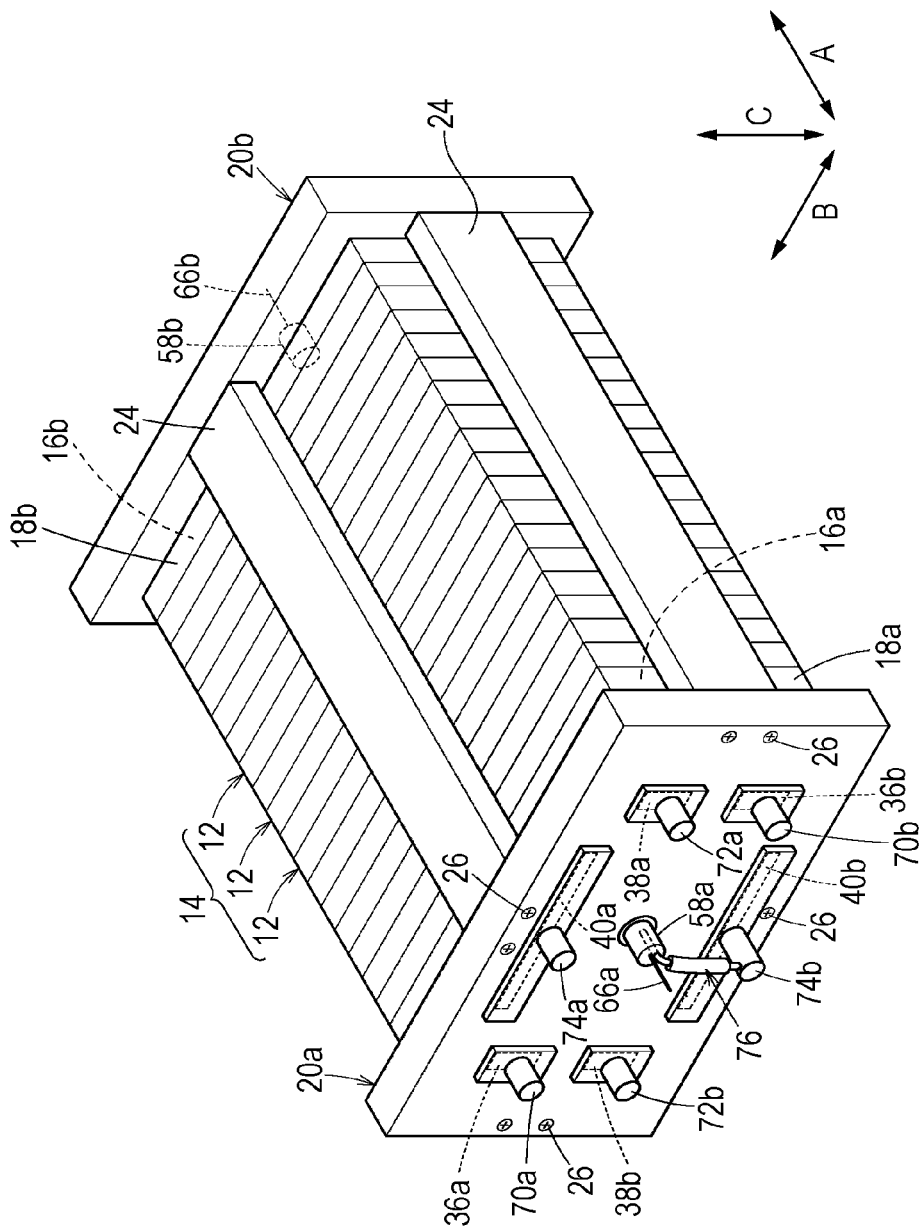
FIG. 1 is a perspective view of a fuel cell stack according to a first embodiment of the present disclosure.

The embodiments will now be described with reference to the accompanying drawings, wherein like reference numerals designate corresponding or identical elements throughout the various drawings.

Figure 2:
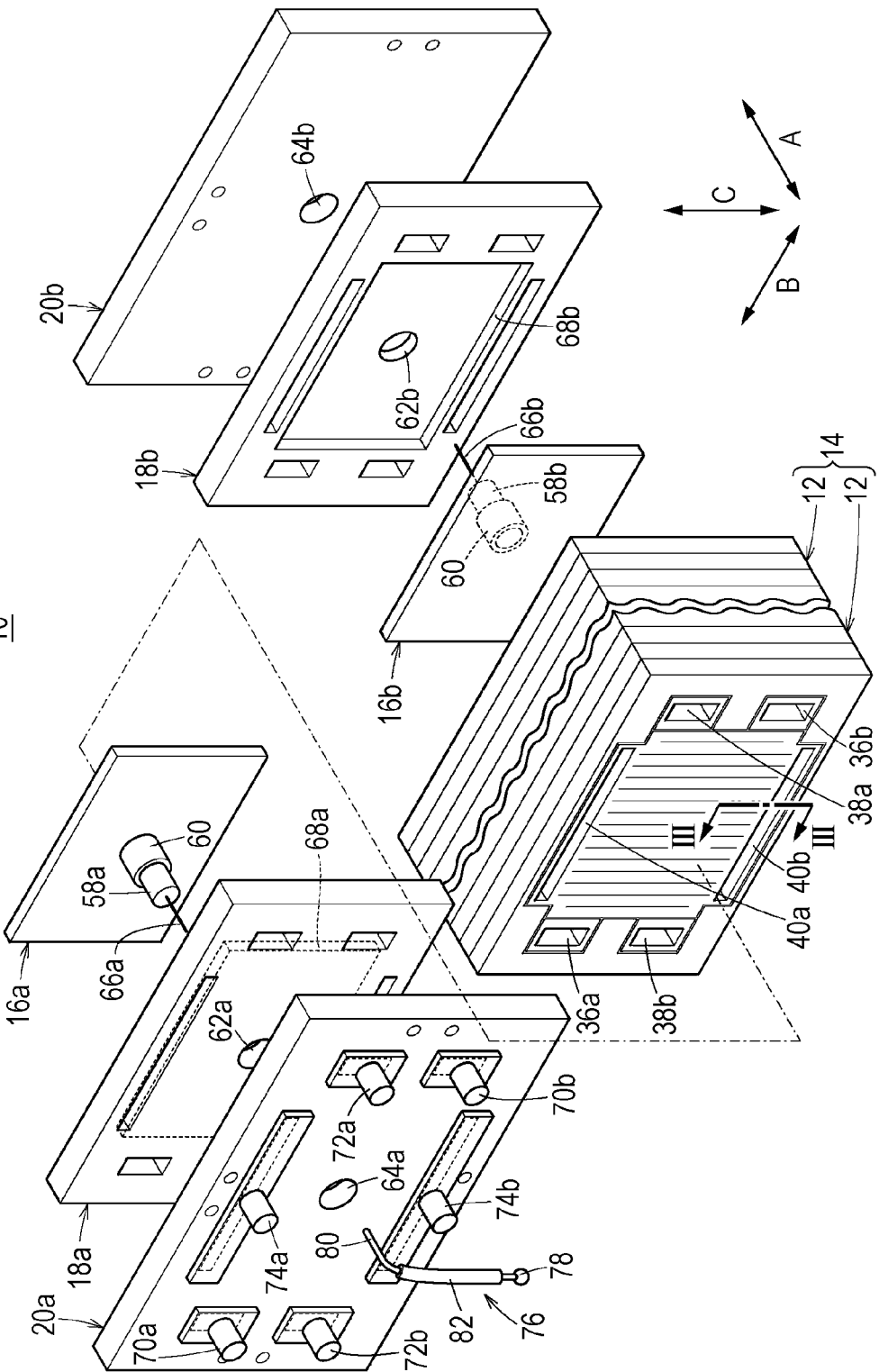
FIG. 2 is a partially exploded schematic perspective view of the fuel cell stack.

FIGS. 1 and 2 illustrate a fuel cell stack 10 according to a first embodiment of the present disclosure. The fuel cell stack 10 is used, for example, as an automobile fuel cell stack of a fuel cell electric automobile (not shown).

The fuel cell stack 10 includes a stacked body 14 in which a plurality of power generation cells 12 are stacked in a horizontal direction (direction of arrow A). Alternatively, the power generation cells may be stacked in a vertical direction (direction of arrow C). At one end of the stacked body 14 in the stacking direction (direction of arrow A), a terminal plate 16a, an insulator (insulation plate) 18a, and an end plate 20a are arranged outward in the stacking direction in this order (see FIG. 2). At the other end of the stacked body 14 in the stacking direction, a terminal plate 16b, an insulator (insulation plate) 18b, and an end plate 20b are stacked outward in the stacking direction in this order.

As illustrated in FIG. 1, the end plates 20a and 20b, which are made of a metal or a resin, has a horizontally elongated (or vertically elongated) rectangular shape. Connection bars 24 are disposed between corresponding end portions of the end plates 20a and 20b. Ends of the connection bars 24 are fixed to the end plates 20a and 20b with bolts 26 so as to apply a clamping load to the stacked body of the power generation cells 12 in the stacking direction (direction of arrow A). The fuel cell stack 10 may have a housing including the end plates 20a and 20b, and the stacked body 14 may be disposed in the housing.

Figure 3:
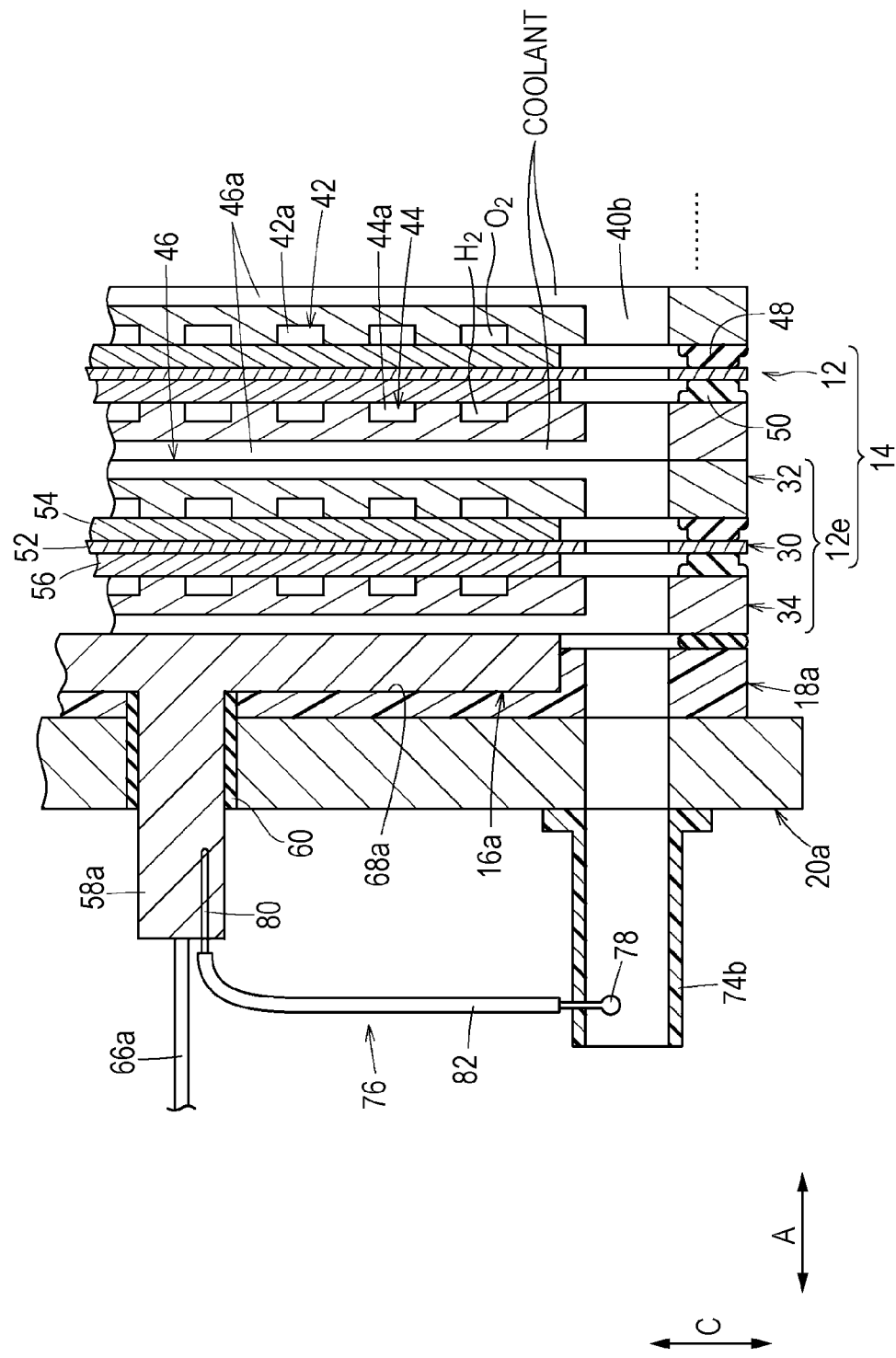
FIG. 3 is a sectional view of the fuel cell stack taken along line III-III of FIG. 2.
Figure 4:
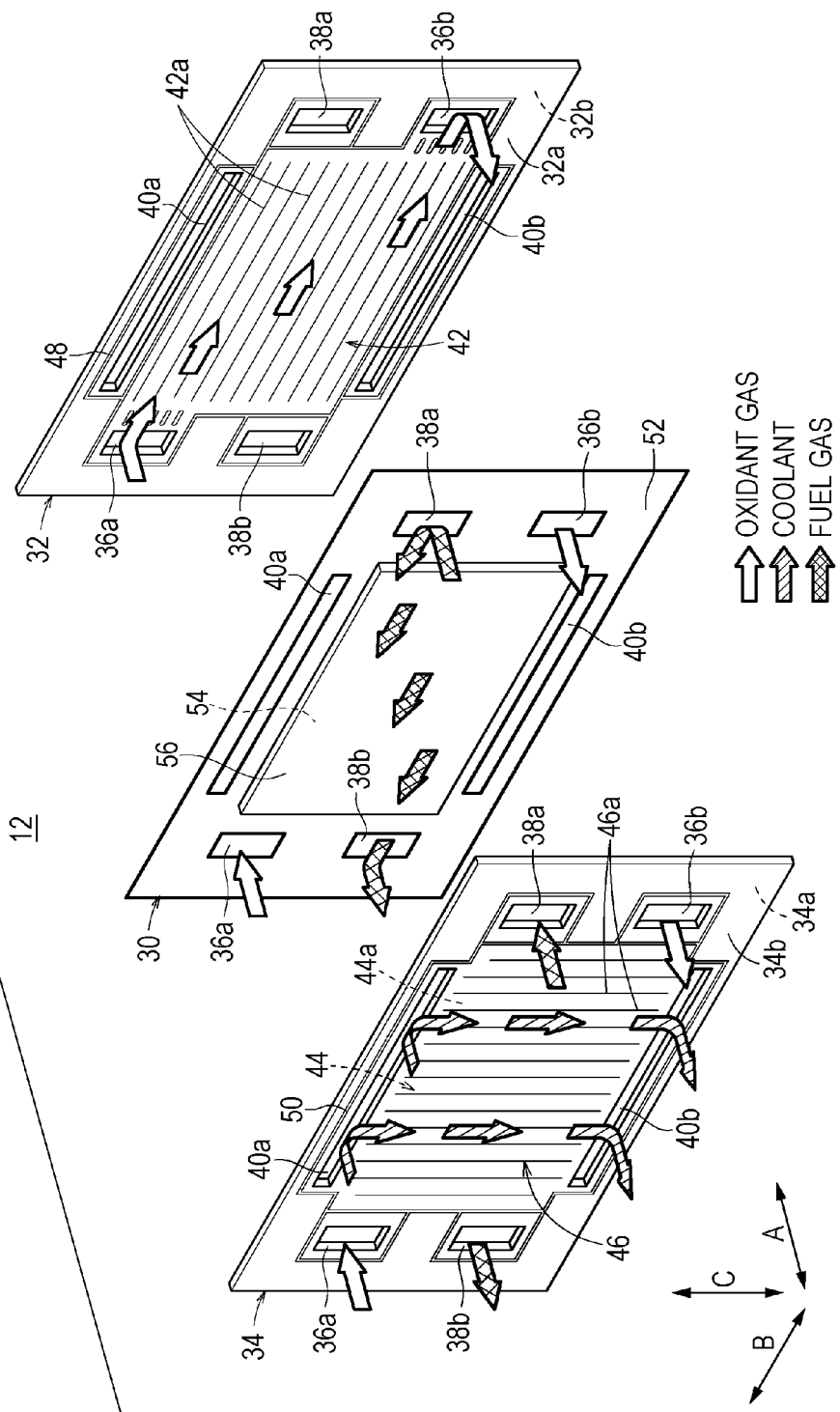
FIG. 4 is an exploded perspective view of a power generation cell included in the fuel cell stack.

As illustrated in FIGS. 3 and 4, in each power generation cell 12, a membrane electrode assembly 30 is sandwiched between a first separator (cathode separator) 32 and a second separator (anode separator) 34. Each of the first separator 32 and the second separator 34 is, for example, a carbon separator. Each of the first separator 32 and the second separator 34 may be a metal separator made by pressforming a metal plate, such as a steel plate, a stainless steel plate, an aluminum plate, a galvanized steel plate, or a thin plate made of another metal.

An oxidant gas inlet manifold (fluid manifold) 36a and a fuel gas outlet manifold (fluid manifold) 38b are formed in the power generation cells 12 so as to extend in the stacking direction (direction of arrow A) through one end portion of each of the power generation cells 12 in the direction of arrow B (horizontal direction in FIG. 4). The manifolds 36a and 38b are arranged in the direction of arrow C (vertical direction). An oxidant gas, such as an oxygen-containing gas, is supplied through the oxidant gas inlet manifold 36a.

A fuel gas, such as a hydrogen-containing gas, is discharged through the fuel gas outlet manifold 38b.

A fuel gas inlet manifold (fluid manifold) 38a and an oxidant gas outlet manifold (fluid manifold) 36b are formed in the power generation cells 12 so as to extend in the direction of arrow A through the other end portion of each of the power generation cells 12 in the direction of arrow B. The manifolds 38a and 36b are arranged in the direction of arrow C.

A coolant inlet manifold (fluid manifold) 40a is formed in the power generation cells 12 so as to extend through an upper end portion of each of the power generation cells 12 in the direction of arrow C. A coolant is supplied through the coolant inlet manifold 40a. A coolant outlet manifold (fluid manifold) 40b is formed in the power generation cells 12 so as to extend through a lower end portion of each of the power generation cells 12 in the direction of arrow C. The coolant is discharged through the coolant outlet manifold 40b.

An oxidant gas channel 42, which is connected to the oxidant gas inlet manifold 36a and the oxidant gas outlet manifold 36b, is formed on a surface 32a of the first separator 32 facing the membrane electrode assembly 30. The oxidant gas channel 42 has a plurality of channel grooves 42a extending in the horizontal direction (direction of arrow B).

A fuel gas channel 44, which is connected to the fuel gas inlet manifold 38a and the fuel gas outlet manifold 38b, is formed on a surface 34a of the second separator 34 facing the membrane electrode assembly 30. The fuel gas channel 44 has a plurality of channel grooves 44a extending in the horizontal direction (direction of arrow B).

A coolant channel 46, which is connected to the coolant inlet manifold 40a and the coolant outlet manifold 40b, is formed between a surface 32b of the first separator 32 of a power generation cell 12 and a surface 34b of the second separator 34 of an adjacent power generation cell 12, the surfaces 32b and 34b facing each other. The coolant channel 46 has a plurality of channel grooves 46a extending in the vertical direction (direction of arrow C).

A first sealing member 48 and a second sealing member 50 are integrally formed with or independently formed on the first separator 32 and the second separator 34, respectively. Each of the first sealing member 48 and the second sealing member 50 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprenerubber, and acrylic rubber.

The membrane electrode assembly 30 includes a solid polymer electrolyte membrane 52, and a cathode electrode 54 and an anode electrode 56 sandwiching the solid polymer electrolyte membrane 52 therebetween. The solid polymer electrolyte membrane 52 is, for example, a thin film that is made of a perfluorosulfonic acid copolymer and soaked with water.

The solid polymer electrolyte membrane 52 has a size in plan view larger than that of each of the cathode electrode 54 and the anode electrode 56. In the present embodiment, the cathode electrode 54 and the anode electrode 56 have the same size in plan view. However, the membrane electrode assembly 30 may be a so-called stepped MEA, in which the cathode electrode 54 and the anode electrode 56 have different sizes in plan view.

The cathode electrode 54 and the anode electrode 56 each include a gas diffusion layer and an electrode catalyst layer.

The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed, for example, on both sides of the solid polymer electrolyte membrane 52.

As illustrated in FIG. 2, terminal electrodes 58a and 58b extend from substantially the centers of the terminal plates 16a and 16b outward in the stacking direction, respectively. The terminal electrode 58a is inserted into an insulating tube 60, extends through a hole 62a in the insulator 18a and a hole 64a in the end plate 20a, and protrudes to the outside of the end plate 20a. The terminal electrode 58b is inserted into an insulating tube 60, extends through a hole 62b in the insulator 18b and a hole 64b in the end plate 20b, and protrudes to the outside of the end plate 20b. Harnesses 66a and 66b are connected to ends of the terminal electrodes 58a and 58b, respectively.

The insulators 18a and 18b are each made of an electrically insulating material, such as polycarbonate (PC), a phenol resin, or the like. The insulators 18a and 18b have recesses 68a and 68b in which the terminal plates 16a and 16b are disposed, respectively. The insulators 18a and 18b each have a size in plan view that is substantially the same as that of the stacked body 14.

As illustrated in FIGS. 1 and 2, an external oxidant gas supply manifold 70a and an external fuel gas discharge manifold 72b are attached to one end portion of the end plate 20a in the direction of arrow B. The external oxidant gas supply manifold 70a and the external fuel gas discharge manifold 72b are connected to the oxidant gas inlet manifold 36a and the fuel gas outlet manifold 38b, respectively. An external fuel gas supply manifold 72a and an external oxidant gas discharge manifold 70b are attached to the other end portion of the end plate 20a in the direction of arrow B. The external fuel gas supply manifold 72a and the external oxidant gas discharge manifold 70b are connected to the fuel gas inlet manifold 38a and the oxidant gas outlet manifold 36b, respectively.

An external coolant supply manifold 74a is attached to one end portion (upper end portion) of the end plate 20a in the direction of arrow C. The external coolant supply manifold 74a is connected to the coolant inlet manifold 40a. An external coolant discharge manifold 74b is attached to the other end portion (lower end portion) of the end plate 20a in the direction of arrow C. The external coolant discharge manifold 74b is connected to the coolant outlet manifold 40b.

Some of the external manifolds may be attached to one of the end plates 20a and 20b and the other external manifolds may be attached to the other of the end plates 20a and 20b. For example, the external oxidant gas supply manifold 70a, the external oxidant gas discharge manifold 70b, the external fuel gas supply manifold 72a, and the external fuel gas discharge manifold 72b can be attached to one of the end plates (20a or 20b). In this case, the external coolant supply manifold 74a and the external coolant discharge manifold 74b can be attached to the other end plate (20b or 20a).

As illustrated in FIGS. 1 to 3, a heat pipe assembly 76 is disposed in an outer portion of the fuel cell stack 10 near at least one of the end plates, such as the end plate 20a. Note that another heat pipe assembly 76 may be disposed near the end plate 20b. The heat pipe assembly 76 includes a heat receiving portion 78, which is located at one end of the heat pipe assembly 76. The heat receiving portion 78 is disposed in the coolant outlet manifold (fluid manifold) 40b directly or via the external coolant discharge manifold 74b. The heat receiving portion 78 receives heat from the coolant (fluid).

Preferably, as illustrated in FIG. 3, the heat receiving portion 78 is inserted into the external coolant discharge manifold 74b through an outer peripheral part of the external coolant discharge manifold 74b, the outer peripheral part having a liquid-tight sealing structure (not shown). The heat pipe assembly 76 includes a heat dissipation portion 80, which is located at the other end of the heat pipe assembly 76. The heat dissipation portion 80 dissipates heat received by the heat receiving portion 78. The heat dissipation portion 80 is connected to the terminal electrode 58a, which is disposed on the terminal plate 16a and exposed to the outside of the fuel cell stack 10 (in the direction of arrow A). A jacket 82, which has heat insulation property and electric insulation property, is disposed between the heat receiving portion 78 and the heat dissipation portion 80.

The heat pipe assembly 76 is structured as a hermetic container. Although not illustrated, when working fluid absorbs heat and is evaporated at an inner wall of the heat receiving portion 78, which is a high-temperature portion, the evaporated working fluid passes through a cavity to the heat dissipation portion 80, which is a low-temperature portion. The evaporated working fluid is cooled in the heat dissipation portion 80, condenses back to liquid, and is absorbed by a wick (having a structure that causes capillary action) on the inner wall of the hermetic container. The working fluid flows through the wick to the heat receiving portion 78. Preferably, the heat receiving portion 78 is disposed below the heat dissipation portion 80 in the direction of gravity. In this case, condensed working fluid flows to the heat receiving portion 78 due to gravity.

Figure 5:
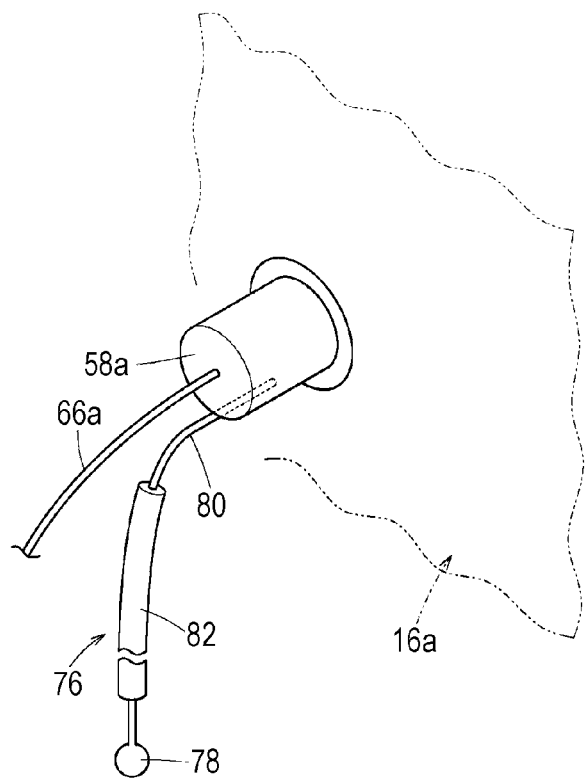
FIG. 5 illustrates a heat pipe assembly of the fuel cell stack connected in another way.

The heat dissipation portion 80 is inserted into the terminal electrode 58a. However, this is not a limitation. For example, as illustrated in FIG. 5, the heat dissipation portion 80 may be disposed along the outer peripheral surface of the terminal electrode 58a and fixed to the outer peripheral surface by fusing, welding, or by using an adhesive in such a way that heat can be transferred from the heat dissipation portion 80 to the terminal electrode 58a.

Figure 6:
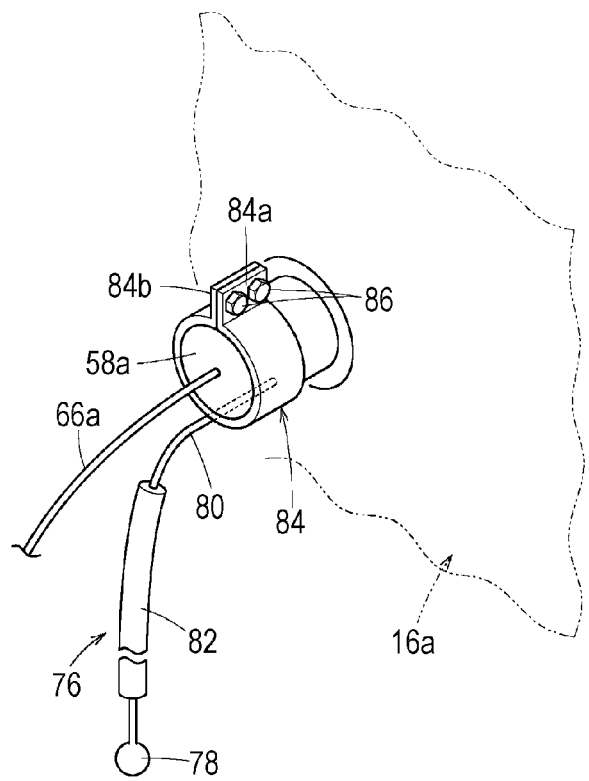
FIG. 6 illustrates a heat pipe assembly of the fuel cell stack connected in a still another way.

As illustrated in FIG. 6, an attachment member 84 having a substantially annular shape may be used. In this case, the heat dissipation portion 80 is fixed to the outer peripheral surface of the attachment member 84 in such a way that heat can be transferred from the heat dissipation portion 80 to the attachment member 84. The attachment member 84 is fixed to the terminal electrode 58a by fastening a pair of flange portions 84a and 84b of the attachment member 84 with bolts 86 and nuts (not shown). The heat pipe assembly 76 according to the present disclosure may be attached to the terminal electrode 58b.

The position of the heat receiving portion 78 is not limited to the coolant outlet manifold 40b. The heat receiving portion 78 may be disposed in the coolant inlet manifold 40a, the oxidant gas outlet manifold 36b, the fuel gas outlet manifold 38b, the oxidant gas inlet manifold 36a, or the fuel gas inlet manifold 38a. The same applies to the second embodiment described below.

Hereinafter, an operation of the fuel cell stack 10 having the above structure will be described.

Referring to FIG. 1, first, an oxidant gas, such as an oxygen-containing gas, is supplied from the external oxidant gas supply manifold 70a on the end plate 20a to the oxidant gas inlet manifold 36a. A fuel gas, such as a hydrogen-containing gas, is supplied from the external fuel gas supply manifold 72a on the end plate 20a to the fuel gas inlet manifold 38a. A coolant, such as pure water, ethylene glycol, or oil, is supplied from the external coolant supply manifold 74*a* on the end plate 20*a* to the coolant inlet manifold 40*a*.

As illustrated in FIG. 4, the oxidant gas is introduced from the oxidant gas inlet manifold 36*a* to the oxidant gas channel 42 of the first separator 32. The oxidant gas is supplied to the cathode electrode 54 of the membrane electrode assembly 30 while flowing along the oxidant gas channel 42 in the horizontal direction (direction of arrow B).

The fuel gas is introduced from the fuel gas inlet manifold 38*a* to the fuel gas channel 44 of the second separator 34. The fuel gas is supplied to the anode electrode 56 of the membrane electrode assembly 30 while flowing along the fuel gas channel 44 in the horizontal direction (direction of arrow B).

Accordingly, in the membrane electrode assembly 30, the oxidant gas supplied to the cathode electrode 54 and the fuel gas supplied to the anode electrode 56 are consumed in electrochemical reactions in the electrode catalyst layers, thus generating electric power.

Next, the oxidant gas, which has been supplied to the cathode electrode 54 and consumed, is discharged along the oxidant gas outlet manifold 36*b* in the direction of arrow A. The fuel gas, which has been supplied to the anode electrode 56 and consumed, is discharged along the fuel gas outlet manifold 38*b* in the direction of arrow A.

The coolant, which has been supplied to the coolant inlet manifold 40*a*, is introduced into the coolant channel 46 between the first separator 32 and the second separator 34 and flows in the direction of arrow C. The coolant cools the membrane electrode assembly 30 and is discharged from the coolant outlet manifold 40*b*.

In the first embodiment, as illustrated in FIG. 3, the heat receiving portion 78 of the heat pipe assembly 76 is inserted into the external coolant discharge manifold 74*b*, which is disposed at an end of the coolant outlet manifold 40*b*. Therefore, the heat receiving portion 78 can receive heat from used coolant flowing through the coolant outlet manifold 40*b*, that is, coolant that has cooled the power generation cells 12 and whose temperature has been increased.

Heat received by the heat receiving portion 78 is dissipated from the heat dissipation portion 80, which is embedded in the terminal electrode 58*a* exposed to the outside of the fuel cell stack 10, to the entirety of the terminal plate 16*a*. Accordingly, the temperature of the terminal plate 16*a*, which is at an end of the fuel cell stack 10 in the stacking direction, is increased rapidly. As a result, dissipation of heat from an end power generation cell 12*e*, which is disposed at an end of the stacked body 14, can be appropriately suppressed.

FIG. 7 shows a comparison between the temperature (representative temperature) of the terminal plate 16*a* in the case where the heat pipe assembly 76 is present and the temperature (representative temperature) of the terminal plate 16*a* in the case where the heat pipe assembly 76 is absent. In the case where the heat pipe assembly 76 is present, the temperature of the terminal plate 16*a* is between the coolant inlet temperature and the coolant outlet temperature, that is, within an appropriate MEA temperature range. In the case where the heat pipe assembly 76 is absent, the temperature of the terminal plate 16*a* is lower than the coolant inlet temperature, that is, below an appropriate MEA temperature range.

FIG. 8 shows the temperatures (representative temperatures) of parts of the fuel cell stack 10 in the case where the heat pipe assembly 76 is present and the temperatures (representative temperatures) of the parts of the fuel cell stack 10 in the case where the heat pipe assembly 76 is absent. In the case where the heat pipe assembly 76 is present, the temperatures of parts of the fuel cell stack 10, which are distributed from the inside of the fuel cell stack 10 to the outer surface of the end plate 20*a*, are maintained within the appropriate MEA temperature range. In the case where the heat pipe assembly 76 is absent, the temperatures of outer parts of the fuel cell stack 10 in the stacking direction are lower than the temperatures of the inner parts of the fuel cell stack 10 in the stacking direction and are below the appropriate MEA temperature range.

Thus, the first embodiment has an advantage in that decrease of the temperature of, in particular, the end power generation cell 12*e*, which is disposed at an end in the stacking direction, can be reliably suppressed and the fuel cell stack can be appropriately warmed up with a simple and compact structure. Moreover, because the heat pipe assembly 76 is disposed in an outer portion of the fuel cell stack 10, it is possible to retrofit the heat pipe assembly 76 without changing the inner structure of the fuel cell stack 10.

FIGS. 9 and 10 illustrate a fuel cell stack 90 according to a second embodiment of the present disclosure. The fuel cell stack 90 includes terminal plates 92*a* and 92*b*, insulators 94*a* and 94*b*, and end plates 96*a* and 96*b*. Elements of the fuel cell stack 90 that are the same as those of the fuel cell stack 10 according to the first embodiment are denoted by the same numerals and detailed description of such elements will be omitted.

The terminal plates 92*a* and 92*b* are disposed in the recesses 68*a* and 68*b* of the insulators 94*a* and 94*b*. The terminal plates 92*a* and 92*b* include terminal electrode plates (terminal electrodes) 98*a* and 98*b*, instead of the terminal electrodes 58*a* and 58*b*. The terminal electrode plates 98*a* and 98*b* are exposed to the outside of the fuel cell stack 90, and the harnesses 66*a* and 66*b* for outputting electric power from the fuel cell stack 90 are connected to the terminal electrode plates 98*a* and 98*b*. The terminal electrode plates 98*a* and 98*b* have plate-like shapes, protrude outward from ends of the terminal plates 92*a* and 92*b*, and extend outward through cutout portions 100*a* and 100*b* of the insulators 94*a* and 94*b*.

A heat pipe assembly 102 is disposed in an outer portion of the fuel cell stack 90 near the end plate 96*a*. The heat pipe assembly 102 includes a heat receiving portion 104, which is located at one end of the heat pipe assembly 102. The heat receiving portion 104 is disposed in the external coolant discharge manifold 74*b* and receives heat from the coolant.

The heat pipe assembly 102 includes a heat dissipation portion 106, which is located at the other end of the heat pipe assembly 102. The heat dissipation portion 106 is connected to the terminal electrode plate 98*a*, which is disposed on the terminal plate 92*a* and exposed to the outside of the fuel cell stack 90 (in the direction of arrow C). The heat dissipation portion 106 dissipates heat received by the heat receiving portion 104. The heat dissipation portion 106 is embedded in or attached to the terminal electrode plate 98*a* in such a way that heat can be transferred from the heat dissipation portion 106 to the terminal electrode plate 98*a*. A jacket 108, which has heat insulation property and electric insulation property, is disposed between the heat receiving portion 104 and the heat dissipation portion 106.

According to the second embodiment having the above structure, heat received by the heat receiving portion 104 is dissipated from the heat dissipation portion 106, which is connected to the terminal electrode plate 98*a* exposed to the outside of the fuel cell stack 90, to the entirety of the terminal plate 92*a*. Thus, the second embodiment provides an advantage the same as that of the first embodiment, in that decrease of the temperature of the power generation cells 12 can be reliably suppressed and the fuel cell stack can be appropriately warmed up with a simple and compact structure.

According to the present disclosure, a fuel cell stack includes a stacked body in which a plurality of power generation cells are stacked. Each of the power generation cells includes an electrolyte electrode assembly and a separator, the electrolyte electrode assembly including an electrolyte and a pair of electrodes sandwiching the electrolyte therebetween. In the fuel cell stack, a fluid manifold extends in a stacking direction of the stacked body. The fluid manifold allows a fluid to flow therethrough, the fluid being one of a fuel gas, an oxidant gas, and a coolant. A terminal plate, an insulator, and an end plate are disposed at each of two ends of the stacked body in the stacking direction.

A heat pipe assembly is disposed in an outer portion of the fuel cell stack near at least one of the end plates. The heat pipe assembly includes a heat receiving portion disposed in the fluid manifold and receiving heat from the fluid, and a heat dissipation portion connected to a terminal electrode that is disposed on the terminal plate and that is exposed to the outside of the fuel cell stack. The heat dissipation portion dissipates heat, received by the heat receiving portion, to the terminal electrode.

In the heat pipe assembly according the present disclosure, heat is received from the fluid manifold, through which the coolant or a reactant gas flows, to the heat receiving portion, and the heat is dissipated directly from the heat dissipation portion to the terminal electrode disposed on the terminal plate. Therefore, the temperature of the terminal plate is increased appropriately and efficiently. Accordingly, the temperature of an end portion of the fuel cell stack in the stacking direction, in particular, the temperature of an end power generation cell disposed at an end portion of the stacked body, is maintained at a temperature that is substantially the same as that of a power generation cell at a central part of the fuel cell during power generation.

Moreover, if the temperature of the terminal electrode is lower than that of the fluid manifold, heat exchange is performed. That is, the heat pipe assembly functions as a thermal diode. Thus, the temperature of the end power generation cell can be appropriately maintained also during warm-up. Therefore, the fuel cell stack can reliably suppress decrease of the temperature of the end power generation cell and can be appropriately warmed up with a simple and compact structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stacked body in which a plurality of power generation cells are stacked, each of the power generation cells including an electrolyte electrode assembly and a separator, the electrolyte electrode assembly including an electrolyte and a pair of electrodes sandwiching the electrolyte therebetween;
a fluid manifold extending in a stacking direction of the stacked body, the fluid manifold allowing a fluid to flow therethrough, the fluid being one of a fuel gas, an oxidant gas, and a coolant;
a terminal plate, an insulator, and an end plate that are disposed at each of two ends of the stacked body in the stacking direction; and
a heat pipe assembly disposed in an outer portion of the fuel cell stack near at least one of the end plates,
wherein the heat pipe assembly includes
a heat receiving portion disposed in the fluid manifold and receiving heat from the fluid, and
a heat dissipation portion extending from a surface of a terminal electrode that is disposed on the terminal plate and that is exposed to the outside of the fuel cell stack, the heat dissipation portion dissipating heat, received by the heat receiving portion, to the terminal electrode.

2. A fuel cell stack comprising:
a stacked body which includes power generation cells stacked in a stacking direction and which has a first end in the stacking direction, each of the power generation cells comprising:
an electrolyte electrode assembly comprising:
a first electrode;
a second electrode; and
an electrolyte sandwiched between the first electrode and the second electrode; and
a separator provided on the electrolyte electrode assembly in the stacking direction;
a fluid manifold which extends through the stacked body in the stacking direction and through which a fluid is to flow;
a first terminal plate provided on the first end of the stacked body in the stacking direction;
a first insulator provided on the first terminal plate in the stacking direction;
a first end plate provided on the first insulator in the stacking direction;
a terminal electrode connected to the first terminal plate and protruding from the first end plate in the stacking direction; and
a heat pipe assembly comprising:
a heat receiving portion disposed in the fluid manifold to receive heat from the fluid; and
a heat dissipation portion extending from a surface of the terminal electrode to release heat received at the heat receiving portion to the terminal electrode.

3. The fuel cell stack according to claim 2, further comprising:
a second terminal plate;
a second insulator; and
a second end plate,
wherein the stacked body has a second end opposite to the first end in the stacking direction,
wherein the second terminal plate is provided on the second end of the stacked body in the stacking direction,
wherein the second insulator is provided on the second terminal plate, and
wherein the second end plate is provided on the second insulator.

4. The fuel cell stack according to claim 2,
wherein the heat pipe assembly is provided on an opposite side of the stacked body with respect to the first end plate.

5. The fuel cell stack according to claim 2,
wherein the heat receiving portion is provided below the heat dissipation portion in a direction of gravity.

6. The fuel cell stack according to claim 1,
wherein the surface of the terminal electrode is an outer surface of the terminal electrode disposed outside of the end plates in the stacking direction.

7. The fuel cell stack according to claim 6,
wherein the heat dissipation portion directly contacts the outer surface of the terminal electrode or extends within the terminal electrode.

8. The fuel cell stack according to claim 7,
wherein the heat dissipation portion extends within the terminal electrode.

9. The fuel cell stack according to claim 2,
wherein the surface of the terminal electrode is an outer surface of the terminal electrode disposed outside of the first end plate in the stacking direction.

10. The fuel cell stack according to claim 9,
wherein the heat dissipation portion directly contacts the outer surface of the terminal electrode or extends within the terminal electrode.

11. The fuel cell stack according to claim 10,
wherein the heat dissipation portion extends within the terminal electrode.

12. A fuel cell stack comprising:
a stacked body in which a plurality of power generation cells are stacked, each of the power generation cells including an electrolyte electrode assembly and a separator, the electrolyte electrode assembly including an electrolyte and a pair of electrodes sandwiching the electrolyte therebetween;
a fluid manifold extending in a stacking direction of the stacked body, the fluid manifold allowing a fluid to flow therethrough, the fluid being one of a fuel gas, an oxidant gas, and a coolant;
a terminal plate, an insulator, and an end plate disposed at an end of the stacked body in the stacking direction; and
a heat pipe assembly disposed outside of the end plate of the fuel cell stack,
wherein the heat pipe assembly includes
a heat receiving portion disposed in the fluid manifold and receiving heat from the fluid, and
a heat dissipation portion connected to a terminal electrode that is disposed on the terminal plate and that is exposed to the outside of the fuel cell stack, the heat dissipation portion configured to dissipate heat, received by the heat receiving portion, to the terminal electrode.

* * * * *